United States Patent [19]

Klein

[11] 3,846,828

[45] Nov. 5, 1974

[54] HIGH SOLIDS CONTENT VINYLIDENE CHLORIDE POLYMER DISPERSIONS IN STRONGLY HYDROGEN BONDED DISPERSING MEDIA AND PROCESS OF PREPARATION THEREOF

[75] Inventor: Dieter H. Klein, Midland, Mich.

[73] Assignee: The Dow Chemical Company, Midland, Mich.

[22] Filed: Apr. 4, 1973

[21] Appl. No.: 347,828

[52] U.S. Cl. .................. 260/33.4 R, 260/296 RB, 260/29.6 NR, 260/31.4 R, 260/32.8 N, 260/86.1 N, 260/884, 260/889
[51] Int. Cl. ...................... C08f 45/24, C08f 45/34
[58] Field of Search ..... 260/884, 885, 2 EN, 486 B, 260/486 R, 89.5 R, 33.4 R, 900, 899

[56] References Cited
UNITED STATES PATENTS 3,017,396  1/1962  Arond .............................. 260/86.3
3,317,635  5/1967  Osmond ............................ 260/881

FOREIGN PATENTS OR APPLICATIONS 1,052,241  12/1966  Great Britain

Primary Examiner—Morris Liebman
Assistant Examiner—P. R. Michl
Attorney, Agent, or Firm—Ronald G. Brookens

[57] ABSTRACT

High solids content vinylidene chloride polymers, and particularly copolymers of vinylidene chloride with a comonomer containing a hydroxyl functionality, are prepared by polymerization of the monomeric ingredients of said polymers in a strongly hydrogen bonded dispersing media containing from about 0.1 to 20 percent of a dispersion stabilizer said stabilizer comprising the reaction product of (A) tripropylene glycol methylether acrylate and (B) at least one reactive comonomer capable of forming a side chain on said dispersion stabilizer which side chain is dispersible in said vinylidene chloride polymer, and wherein the mass ratio of (A) to (B) is from about 99:1 to 80:20.

10 Claims, No Drawings

HIGH SOLIDS CONTENT VINYLIDENE CHLORIDE POLYMER DISPERSIONS IN STRONGLY HYDROGEN BONDED DISPERSING MEDIA AND PROCESS OF PREPARATION THEREOF

BACKGROUND OF THE INVENTION

It is desirable to prepare high polymer solids content dispersions of vinylidene chloride polymers and particularly vinylidene chloride polymers having significant amounts of water-soluble comonomer in the polymer molecule, for use in coating applications. In this regard, it has been found that copolymerization of such water-soluble monomers with vinylidene chloride monomer in aqueous media results in severe coagulation of the polymer particles. Further, polymerization of such monomers in hydrocarbon media results in the formation of an insoluble copolymeric product. The formation of such insoluble copolymers is believed to be due to an etherification reaction between the hydroxyl groups of the water-soluble monomer which reaction is catalyzed by hydrogen chloride liberated through dehydrohalogenation of the vinylidene chloride polymer.

It has been proposed, e.g., in British Pat. No. 1,052,241, to prepare nonaqueous dispersions of synthetic polymers, such as vinylidene chloride polymers, by incorporating in the disperse polymer particles a graft copolymer in which one polymeric chain is solvated by the organic liquid and another polymeric chain is nonsolvated by the organic liquid and is associated with the insoluble disperse polymer. More specifically, such British patent discloses the nonaqueous dispersion polymerization of a copolymer of vinylidene chloride and methyl acrylate in hexane containing a dispersion stabilizer composed of the reaction product of tertiary butyl methacrylate and propylene glycol monomethacrylate. It has been found, however, that such reaction will produce vinylidene chloride polymer in a relatively low yield, i.e., a conversion of monomer to polymer of about 83 percent. Driven to a higher yield, such composition solidifies instantaneously in the reaction kettle. The referred to British patent further discloses the nonaqueous dispersion polymerization of nonpolar monomers such as styrene, vinyl toluene, divinylbenzene and the like, in a polar organic liquid, such as the lower alcohols, in the presence of a dispersion stabilizer wherein the polymeric chain associated with the insoluble disperse polymer is also nonpolar. Such patent, which is representative of the prior art, does not, however, disclose a means for preparing high solids content nonaqueous dispersions of highly polar vinylidene chloride polymers.

It is an object of the present invention to provide nonaqueous dispersions of vinylidene chloride polymers in yields of 90 percent or greater. It is a further object to prepare such dispersions wherein the vinylidene chloride polymer contains significant amounts of water-soluble comonomers incorporated in the polymer molecule. It is yet another object to provide such nonaqueous dispersions wherein the vinylidene chloride polymer solids are present in amounts of up to about 60 to 70 percent by dispersion weight.

SUMMARY

The above and related objects are attained by preparation of dispersions of vinylidene chloride polymers in a strongly hydrogen bonded dispersing media wherein such dispersions additionally contain from about 0.1 to 20 weight percent based on polymer solids of a dispersion stabilizer comprising the reaction product of (A) tripropylene glycol methylether acrylate and (B) at least one reactive comonomer capable of forming a side chain on such stabilizer which side chain is insoluble in the dispersing media but is associated with the vinylidene chloride polymer; and wherein the mass ratio of (A) to (B) is from about 99:1 to 80:20.

DESCRIPTION OF THE PREFERRED EMBODIMENTS

Typical of the vinylidene chloride polymers forming a component of the dispersions of the present invention, are those normally crystalline materials containing from about 70 to 95 percent by weight of vinylidene chloride with the remainder being composed of one or more monoethylenically unsaturated comonomers exemplary of which are the esters and amides of acrylic acid, methacrylic acid and maleic acid or other copolymerizable vinyl acids. Specific esters are those which contain alcohols of 1–8 carbon atoms, such as methyl acrylate, methyl methacrylate, ethyl acrylate, n-butyl methacrylate, octyl acrylate, 2-ethylhexyl acrylate, etc. Specific amides include acrylamide, methacrylamide, t-butylacrylamide and primary alkyl acrylamides such as n,n-dimethylacrylamide and the like. Other monomers which may be copolymerized with vinylidene chloride include acrylonitrile, methacrylonitrile and acrylates or methacrylates of glycols, e.g., hydroxyethyl, hydroxypropyl or hydroxybutyl acrylate or methacrylate. The preferred vinylidene chloride polymers comprise interpolymers containing from about 80 to 90 parts by weight vinylidene chloride with the remainder being selected from the group consisting of acrylonitrile, methyl acrylate, ethyl acrylate, acrylic acid, hydroxy ethyl acrylate and mixtures thereof. An especially preferred interpolymer (for use as a magnetic tape coating) is an interpolymer of about 80 parts by weight vinylidene chloride, about 10 parts by weight acrylonitrile and about 10 parts by weight of hydroxy ethyl acrylate.

The tripropylene glycol methylether acrylate component of the dispersion stabilizer (A) is essential for achieving adequate solubility in the organic hydrophilic liquid. It is to be understood that such compound may contain small amounts of homologous materials having somewhat higher molecular weight.

Where the dispersing media is highly polar in nature, e.g., methyl, ethyl, propyl, or n-butyl alcohol, the suitable solvatable chain is composed of tripropylene glycol methylether acrylate and a comonomer X. X may be a reactive monomer such as acrylic acid, methacrylic acid, maleic anhydride, glycidyl methacrylate or an aziridine compound of the formula

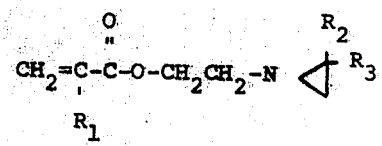

(such compounds are prepared by reaction of aziridinyl alcohols and methyl esters of acrylic or methacrylic acid); or a compound having the formula

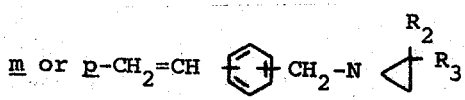

(such compounds are prepared by reaction of ar-vinylbenzyl chloride or bromide and an aziridine in the presence of excess aziridine and a base such as KOH); or a compound having the formula

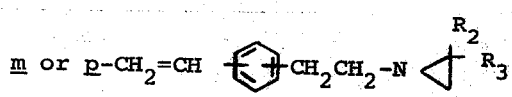

(such compounds are prepared by reaction of an aziridine and divinylbenzene. In the above formulas, $R_1$ is hydrogen or $CH_3$; $R_2$ is hydrogen or lower alkyl, e.g., 1 to 4 carbon atoms); and $R_3$ is hydrogen or lower alkyl, e.g., 1 to 4 carbon atoms.

Preferred compounds, for the aziridine compounds above, are those wherein $R_2$ is hydrogen and $R_3$ is methyl or ethyl. Especially preferred compounds are those wherein $R_2$ and $R_3$ are both hydrogen.

The compound X in the copolymer then may be reacted with compound Y. If X is a monomer containing a carboxyl group Y may be an aziridine compound as set forth above, e.g., 2-(1-aziridinyl ethyl)methacrylate, or vinyl benzyl aziridine, or an acrylate such as glycidyl methacrylate, and the like. If X contains an anhydride group Y may be: hydroxy ethyl, hydroxy propyl, hydroxy butyl acrylate or methacrylate or aminoethyl methacrylate etc. If X is glycidyl methacrylate or an aziridine compound as set forth above, e.g., 2-(1-aziridinyl ethyl)methacrylate or vinyl benzyl aziridine, Y may be: acrylic acid, methacrylic acid, aminoethyl methacrylate, itaconic acid, etc. Y serves to hook on a polymerizable group on the solvatable backbone of tripropylene glycol methylether acrylate - X copolymer. The resulting polymer is a precursor. The precursor may be used in this form or it may be used as a preformed graft polymer. The precursor in this case is reacted with monomers which as a homopolymer would be only partially or not at all soluble in the diluent in which the polymerization is carried out. In order to charge the precursor or preformed graft stabilizer basic, it is preferred that X or y may be a basic monomer such as an aziridine compound as disclosed herein. If a preformed graft polymer is formed, it is of advantage to copolymerize some of these previously mentioned basic charged copolymers. The ratio of tripropylene glycol methylether acrylate to X may be 99:1 to 80:20 but the preferred ratio is 97:3 to 99:1. The amount of Y depends of course on the amount of X. Generally it is preferred to use Y in the theoretical excess of 10 percent.

Where the dispersing media is semipolar in nature such as mixtures of hydrocarbon and alcohol, ethyl acetate, ethylene glycol ether acetate, ethylene glycol butyl ether, etc., some of the tripropylene glycol methyl-ether acrylate may be substituted with other monomers such as poly(12 hydroxystearic acid) acrylate, lauryl acrylate or methacrylate, stearyl methacrylate, ethyl-hexyl acrylate or methacrylate to make the polymer backbone of the stabilizer solvatable in the semipolar solvents.

Using the selected stabilizer precursor or preformed graft stabilizer as described above, stable dispersions of polymer of fine particle size may be formed even if the solvated chains are present in a proportion of as low as 0.1 percent by weight of the disperse polymer, preferably the proportion of solvated chains in the dispersion is from 0.25 to 6 percent but it may be as high as 20 percent by weight of the disperse polymer.

The molecular weight of the precursor preferably is between 10,000 – 40,000. But precursors having a molecular weight of lower than 10,000 or higher than 40,000 have been shown to be operable. It has further been found that it is easier to obtain a stable dispersion if the reactivity ratios of the monomers to be polymerized and the unsaturated group of the stabilizer precursor (Y) are approximately unity.

This invention is adapted to produce powder polymers, colloids (organic systems), solution, lacquers and dispersions via the nonaqueous dispersion route. The nonaqueous dispersion (NAD) resulting can be used, per se, or added improvements can be achieved by using colloidal or solution systems. To form such systems, the technique involves removing the solvent used in the dispersion polymerization to form about 90 – 100 percent solids. After stripping diluent, a solvent is added; this is defined as a solvent or mixture thereof which is compatible with the polymer.

In all such uses the dispersion stabilizer is inherently associated with the vinylidene chloride polymer but is present at low weight percents and serves in ultimate use as a stabilizer for the coating composition only when the dispersion is used, per se. In the colloidal systems, its function is reduced by the coupling solvent. However, in all appropriate systems, it can serve as a self-cross-linking agent and internal plasticizer.

As noted above, the nonaqueous dispersion technique (NAD) is also used to make solution polymers and colloids. The NAD technique uses nontoxic diluents in which the monomers are polymerized, forming large polymer particles of high molecular weight.

The conversion from monomer to polymer in nonaqueous dispersion polymerization takes place more rapidly than in solution polymerization; namely, 5 hours versus 10 hours.

The total diluent composition utilized in the present invention should contain at least about 65 percent by weight of a strongly hydrogen bonded material. Any remainder may be a poorly hydrogen bonded and/or moderately hydrogen bonded solvent or mixtures thereof. Some of the solvents which may be used in this invention are summarized on the following table:

| SOLVENT | SOLUBILITY PARAMETER $\gamma$ | HYDROGEN BONDING INDEX | CLASSIFICATION |
|---|---|---|---|
| Hexane | 7.3 | 2.1 | |
| Isopar E (Isooctane) | 7.1 | 2.5 | |
| VM&P Naphtha | 7.6 | 2.5 | Poorly Hydrogen Bonded |
| High Boiling Aromatics | 8.5 | 2.5 | |
| Toluene | 8.9 | 3.3 | |
| Xylene | 8.8 | 3.5 | |
| Ethyl | 9.1 | 5.2 | |
| Methyl Ethyl Ketone | 9.3 | 5.4 | |
| Acetone | 10.0 | 5.9 | |
| Isopropyl Acetate | 8.4 | 6.0 | Moderately Hydrogen Bonded |
| Ethylene | 8.7 | 6.5 | |

| SOLVENT | SOLUBILITY PARAMETER γ | HYDROGEN BONDING INDEX | CLASSIFICATION |
|---|---|---|---|
| Glycol Ether Acetate | | | |
| Diacetone Alcohol | 9.2 | 6.8 | |
| Ethylene Glycol Butyl Ether | 8.9 | 7.0 | |
| Ethanol | 12.7 | 8.5 | |
| Butanol (iso) | 10.5 | 8.5 | Strongly Hydrogen Bonded |
| Butanol (n) | 11.4 | 8.5 | |
| Isopropanol | 11.5 | 8.7 | |
| H₂O | None | >9.0 | |

Hydrogen bonding indexes are assigned arbitrarily and as can be seen on the preceding table may be used to classify solvents into three groups: poorly, moderately and strongly hydrogen bonded.

However, the diluent composition for colloids should be chosen so as to meet air pollution law legislations, e.g., not more than 20 percent toluene or 8 percent xylene or 20 percent diisobutyl ketone, etc.

To increase the plasticization, external compatible plasticizers conventional in such systems can be added. Preferred plasticizers are esters or phthalic acid, e.g., cyclohexyl butyl ester, dicyclohexyl ester, or benzylhexyl ester.

Cross-link agents may also be added such as methylol acrylamide, methylol methacrylamide, amine imide monomers, melamine-formaldehyde resins, urea-formaldehyde resins or polymers containing isocyanate or blocked isocyanate groups.

Furthermore, it is pointed out that the disclosed aziridine compounds can be used as self-cross-linking agents.

The invention is best understood by reference to the following illustrative examples:

Example 1

A. Preparation of Dispersion Stabilizer Precursor

1200 Parts isooctane were heated to 115°C. in a vessel fitted with stirrer and reflux condenser. During 5 hours a mixture of 697 parts of tripropylene glycol methylether acrylate and 7 parts of 2-(1-aziridinyl ethyl) methacrylate and 1.4 parts of α(t-butylazo)isobutyronitrile was added at a constant rate. The mixture was heated for an additional hour to ensure complete reaction. 4.1 Parts acrylic acid were mixed with 0.5 part hydroquinone and added immediately afterwards with vigorous stirring. The liquid was heated to reflux for another 3 hours and then cooled. The suspension was then allowed to stand for 5 hours to allow the liquids to separate. The lower layer was decanted and vacuum stripped until solids content reached 90 percent.

B. Preparation of Polymer Dispersion

A 400 cc citrate bottle was loaded as follows:

80 Parts vinylidene chloride, 5 parts acrylonitrile, 5 parts ethyl acrylate, 10 parts acrylic acid, 35 parts methanol, 5.5 parts of the precursor solution of A above and 0.5 part azobisisobutyronitrile. The bottle was capped and put in a rotating tumbler containing water having a temperature of 65°C. After 12 hours the bottle was removed and cooled. A fine particle size latex of 70 percent solids was obtained.

Example 2

A. Preparation of dispersion Stabilizer Precursor

930 Parts isooctane, 468.8 parts tripropylene glycol methylether acrylate, 31.2 parts 3-mercaptopropionic acid, 5 parts of α(t-butylazo)isobutyronitrile were heated to reflux in a vessel described in Example 1 for 6 hours. 46 Parts of 2-(1-aziridinyl ethyl)methacrylate were mixed with 0.5 part hydroquinone and added immediately afterwards with vigorous stirring. The liquid was contained at reflux for another 3 hours and cooled. The polymer was isolated as described in Example 1.

B. Preparation of Polymer Dispersion

A 400 cc citrate bottle was loaded as follows:

80 Parts vinylidene chloride, 5 parts acrylonitrile, 5 parts methyl acrylate, 10 parts acrylic acid, 35 parts methanol, 5.5 parts of the precursor solution of A above and 0.5 part azobisisobutyronitrile. The bottle was capped and put in a rotating tumbler containing water having a temperature of 65°C. After 10 hours the bottle was removed and cooled. A fine particle size latex of 70 percent solids was obtained. The molecular weight of the nonsolvated polymer was about 65,000.

Example 3

A. Preparation of Dispersion Stabilizer Precursor

900 Parts isooctane were heated to 98°C. in a vessel described in Example 1. During 2½ hours a mixture of 663 parts tripropylene glycol methylether acrylate, 11.5 parts acrylic acid, 300 parts hexane and 3.5 parts α(t-butylazo)isobutyronitrile was added at a constant rate and the liquid heated for a further hour to ensure conversion. 16.5 Parts 2-(1-aziridinyl ethyl) methacrylate were mixed with 0.3 part hydroquinone and added immediately afterwards with vigorous stirring. The liquid was continued to reflux for another 3 hours and then cooled. The polymer mixture was again treated as described under Example 1.

B. Preparation of Polymer Dispersion

A 400 cc citrate bottle was loaded as follows:

80 Parts vinylidene chloride, 10 parts acrylonitrile, 10 parts hydroxy ethyl acrylate, 35 parts ethanol, 5.5 parts of the precursor solution of A above and 0.5 part of diisopropyl peroxy dicarbonate. The bottle was capped and put in a rotating tumbler containing water having a temperature of 50°C. After 6 hours the bottle was removed and cooled. The contents, containing about 65 percent polymer solids, were stirred vigorously into the equal part of water. The precipitated product was filtered and dried at room temperature on an open tray for three days. The fine powder dissolved easily in methyl ethyl ketone, tetrahydrofuran, toluene or mixtures of mentioned solvents. The solution polymer could be formulated to a pigmented coating containing iron oxide. When cross-linked the coating exhibited excellent abrasion resistance, toughness, elongation and adhesion on mylar, glass, metal, etc. This polymer was found to be especially suitable as a magnetic tape coating.

Example 4

A 400 cc citrate bottle was loaded as follows:

90 Parts vinylidene chloride, 10 parts methyl acrylate, 5.5 parts precursor solution of Example 3, 0.5 part diisopropyl peroxy dicarbonate, and 100 parts methanol. The bottle was capped and put in a rotating tumbler containing water having a temperature of 50°C. After 6 hours the bottle was removed and cooled. The contents containing about 70 percent polymer solids were filtered through a Buchner funnel and the polymer dried in air for several days. The dried polymer dissolved in a mixture of 65 percent tetrahydrofuran and 35 percent toluene to a crystal clear solution.

What is claimed is:

1. Dispersions of normally crystalline vinylidene chloride polymers containing from about 70 to 95 percent by weight of vinylidene chloride in a strongly hydrogen bonded dispersing media said dispersions containing about 0.1 to 20 percent based on polymer solids of a dispersion stabilizer consisting essentially of the reaction product of (A) tripropylene glycol methylether acrylate and (B) at least one reactive comonomer capable of forming a side chain on said stabilizer which side chain is insoluble in the hydrophilic liquid and associated with said vinylidene chloride polymer, and wherein the mass ratio of (A) to (B) is from about 99:1 to 80:20.

2. The dispersions of claim 1 wherein said strongly hydrogen bonded dispersing media contains at least about 65 percent by weight of an aliphatic alcohol containing from about 1 to 4 carbon atoms.

3. The dispersions of claim 2 wherein said dispersion contains from about 60 to 70 percent by weight of polymer solids.

4. The dispersions of claim 3 wherein said normally crystalline vinylidene chloride polymer contains from about 80 to 90 parts by weight of vinylidene chloride with the remainder being selected from the group consisting of acrylonitrile, methyl acrylate, ethyl acrylate acid, hydroxy ethyl acrylate and mixtures thereof.

5. The dispersions of claim 4 wherein said normally crystalline vinylidene chloride polymer is an interpolymer of about 80 parts by weight vinylidene chloride, about 10 parts by weight acrylonitrile and about 10 parts by weight of hydroxy ethyl acrylate.

6. In the process of preparing a nonaqueous dispersion of individual particles of a normally crystalline vinylidene chloride polymer containing from about 70 to 95 percent by weight of vinylidene chloride which process comprises polymerizing the monomeric constituents of said polymer in a nonaqueous dispersing media in the presence of a preformed dispersion stabilizer, the improvement consisting of (1) using as said nonaqueous dispersing media a strongly hydrogen bonded dispersing media and (2) utilizing as said preformed dispersion stabilizer a polymeric material consisting essentially of the reaction product of (A) tripropylene glycol methylether acrylate and (B) at least one reactive comonomer capable of forming a side chain on said stabilizer which side chain is dispersible in said vinylidene chloride polymer and wherein the mass ratio of (A) to (B) is from about 99:1 to 80:20.

7. The process of claim 6 wherein said strongly hydrogen bonded dispersing media contains at least about 65 percent by weight of an aliphatic alcohol containing from about 1 to 4 carbon atoms.

8. The process of claim 7 wherein said dispersion contains from about 60 to 70 percent by weight of polymer solids.

9. The process of claim 8 wherein said normally crystalline vinylidene chloride polymer contains from about 80 to 90 parts by weight of vinylidene chloride with the remainder being selected from the group consisting of acrylonitrile, methyl acrylate, ethyl acrylate, acrylic acid, hydroxy ethyl acrylate and mixtures thereof.

10. The process of claim 9 wherein said normally crystalline vinylidene chloride polymer is an interpolymer of about 80 parts by weight vinylidene chloride, about 10 parts by weight acrylonitrile and about 10 parts by weight of hydroxy ethyl acrylate.

* * * * *